United States Patent [19]
Schubert

[11] Patent Number: 5,381,440
[45] Date of Patent: Jan. 10, 1995

[54] BOTTOM ELECTRODE FOR DIRECT CURRENT ARC FURNACES

[75] Inventor: Manfred Schubert, Oberhausen, Germany

[73] Assignee: Man Gutehoffnungshutte Aktiengesellschaft, Oberhausen, Germany

[21] Appl. No.: 89,785

[22] Filed: Jul. 9, 1993

[30] Foreign Application Priority Data

Jul. 11, 1992 [DE] Germany .................. 4222854

[51] Int. Cl.$^6$ ............................................. F27D 1/00
[52] U.S. Cl. ............................ 373/72; 373/85; 373/108
[58] Field of Search ............... 373/72, 71, 108, 85

[56] References Cited

U.S. PATENT DOCUMENTS

| | | | |
|---|---|---|---|
| 3,218,050 | 11/1965 | Healy et al. | 373/72 |
| 4,592,066 | 5/1986 | Repetto | 373/72 |
| 4,754,464 | 6/1988 | Feuerstake | 373/72 |
| 4,829,538 | 5/1989 | Hlawatschek et al. | 373/72 |
| 5,142,650 | 8/1992 | Kida et al. | 373/72 |
| 5,177,763 | 1/1993 | Takashiba et al. | 373/72 |
| 5,257,280 | 10/1993 | Mimura et al. | 373/85 |
| 5,268,924 | 12/1993 | Sakakibara et al. | 373/72 |

FOREIGN PATENT DOCUMENTS

3543278C1 7/1987 Germany .................. 373/72

Primary Examiner—Bruce A. Reynolds
Assistant Examiner—Tu Hoang
Attorney, Agent, or Firm—McGlew and Tuttle

[57] ABSTRACT

A bottom electrode (1) for d.c. arc furnaces with metal rods (3) arranged on the base plate (2) of the bottom electrode and with conductive and nonconductive layers formed of high temperature-resistant refractory material introduced between them. An upper layer formed of conductive bricks (8), a middle layer formed of conductive, monolithic lining material (9), and a lower layer formed of a nonconductive insulating mass (10) are introduced via the circumference of the base plate (2). In the area of the bricks (8), the metal rods (3) are additionally embedded in a nonconductive mass (11). To introduce inert gases to purge the melt through the bottom electrode (1), the metal rods (3) are provided with a cored hole and, in the upper part, with a number of radial holes in order for the purging gases to be able to be discharged in the area of the bricks (8), or blind holes (13), which are connected to a second purging gas line (13a), are introduced into the lower part of the lined bottom electrode (1).

15 Claims, 5 Drawing Sheets

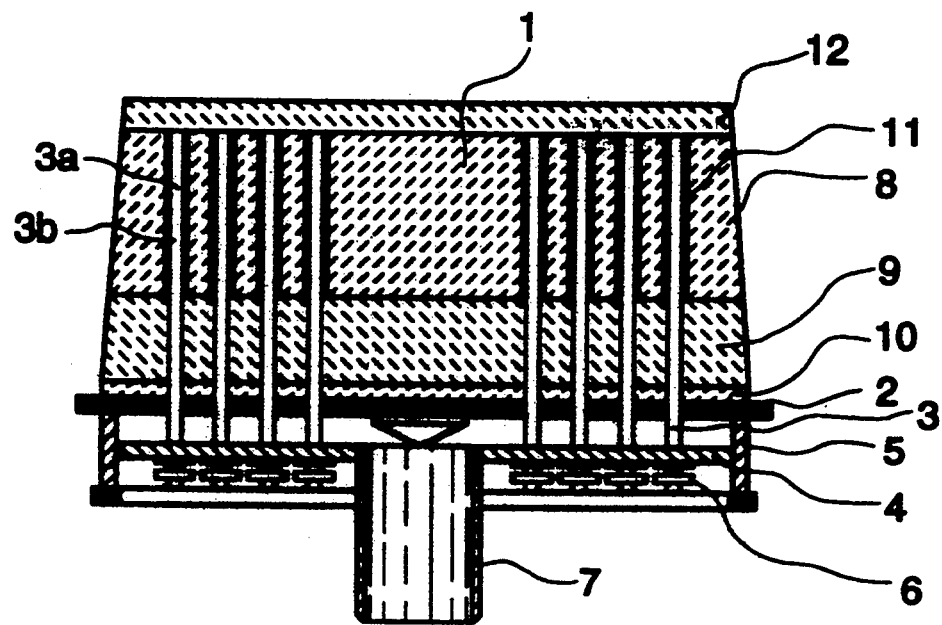
_Fig. 3_
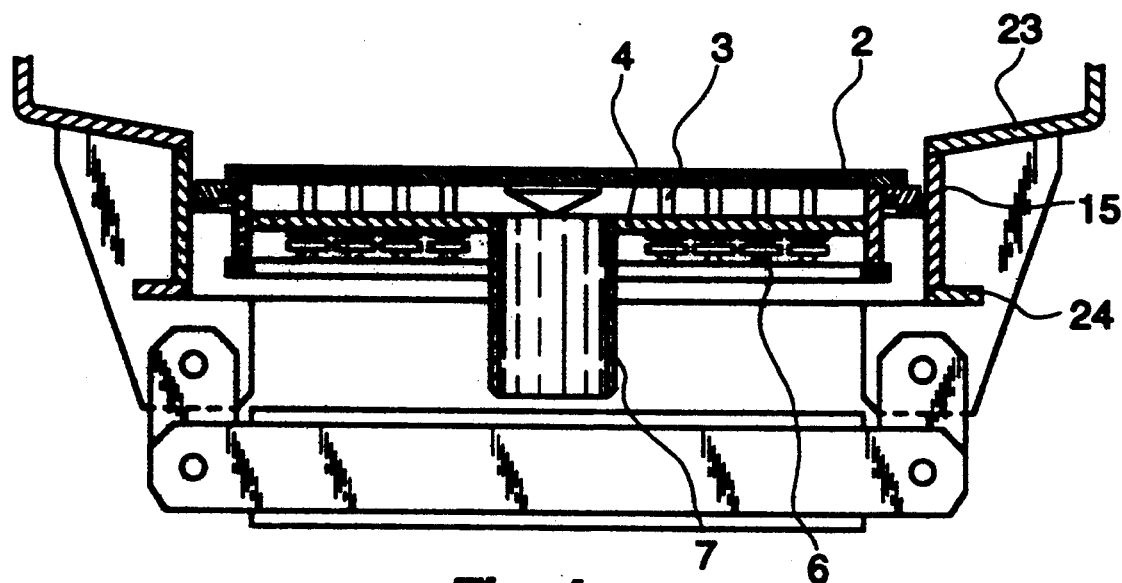
_Fig. 4_

BOTTOM ELECTRODE FOR DIRECT CURRENT ARC FURNACES

FIELD OF THE INVENTION

The present invention pertains to a bottom electrode for d.c. arc furnaces with one or more metal rods arranged vertically in the hearth bottom or with a plurality of metal plates, whose lower ends are detachably fastened in a base plate of the bottom electrode, with layers consisting of conductive or nonconductive refractory materials surrounding the metal rod or metal rods or the metal plates.

BACKGROUND OF THE INVENTION

In the case of the use of a bottom electrode with contact electrodes in the form of metal rods arranged on a base plate according to EP-B-0 058 817 and of the design of the hearth bottom in the form of a plurality of conductive or nonconductive layers consisting of refractory material built up one above another according to EP-B-0 156 126, the metal rods are used as anodes, while a central graphite electrode, arranged from the bottom, is connected as a cathode, which penetrates into the melting vessel through the pivotable cover.

For melting down scrap metal or other metallic charges, the arc first opens in the charge, and later in the melt covered by the slag.

The current now flows from the graphite electrode to the bottom electrode inserted in the center of the hearth bottom, and leads to continuous circulation and partial mixing of the molten steel and slag mixture located above the bottom electrode. It was observed that, especially in d.c. arc furnaces. both the slag and the melt located thereunder circulate from the outside to the inside in the direction of the arc, and that increased wear can be observed above the bottom electrode to the tamped, nonconductive hearth bottom due to the high specific current load of the cathode and anode.

In addition, it was determined that increased wear develops due to so-called pitting corrosion on the metal rods in the area of the upper, fire-side, nonconductive area consisting of refractory material.

SUMMARY AND OBJECTS OF THE INVENTION

The primary object of the present invention is to design a bottom electrode lined with refractory materials, in which abrasion resistance as well as conductivity are improved and wear to the hearth bottom is reduced, and in which the turbulences in the area of the intensified current flow are also eliminated/reduced, and in which additional cooling action can be achieved.

According to the invention, a bottom electrode for direct current arc furnaces is provided comprising one or more metal rods arranged vertically in a hearth bottom or with a plurality of metal plates. The lower ends of the metal rods are detachably fastened in a base plate of the bottom electrode. Layers of conductive or nonconductive refractory materials are provided surrounding the metal rods or the metal plates. A bottom electrode is limited to an area above the circumference of a base plate. The metal rods or metal plates are embedded in an upper layer formed of conductive brick materials, a middle layer formed of conductive, monolithic lining material and a lower layer formed of a non-conductive insulating mass located on the base plate.

The upper layer formed of the conductive brick material preferably count for at least half of the height of the hearth bottom lining. The metal rods or the metal plates are preferably embedding in a nonconductive, high temperature resistant mass formed of low carbon material in the upper conductive layer. Purging gases can preferably be introduced into the melt through the bottom electrode.

Based on the arrangement of the contact electrodes on the base plate in the form of metal rods, especially steel rods, in the hearth bottom of a d.c. arc furnace, according to EP-B-0 058 817, the bottom electrode can be both prefabricated outside the furnace and be lined with the necessary refractory materials in the form of bricks and masses after introduction of the contact electrodes into the bottom of the furnace.

As a measure to improve abrasion or wear, the relatively soft masses are replaced with prefabricated, fired bricks, which are additionally stabilized by higher percentages of monolithic material, especially aluminum oxide, and yet guarantee sufficient heat dissipation.

When designing the bottom electrode, it should be ensured that the electrical conductivity of refractory masses and bricks and that of the metal rods are approximately equal.

By introducing purging gases through the bottom electrode into the melt, the cooling action is improved in the area of the highest current flow density, and the wear of the refractory material at the transition to the bath is reduced.

The finished bottom electrode, provided with refractory materials, is comprised of an upper layer made of conductive brick materials, of a middle layer made of a conductive monolithic lining material, and of a lower layer made of nonconductive insulating mass, wherein the conductive brick layer accounts for at least half of the height of the bottom electrode, and the nonconductive insulating mass has at least twice the height of the bottom plate.

During continuing wear to the hearth bottom, a conductive, high temperature-resistant patching material can be applied to the upper layer of the refractory material of the bottom electrode after emptying the steel sump (so-called hot repair).

In the area of the conductive brick layer, the metal rods are embedded in a nonconductive and abrasion-resistant mass in order to conduct the current flow in the anode specifically through the metal rods and to prevent cross currents or eddy currents between the metal rods and the conductive bricks of the upper layer of the bottom electrode.

The purging gas is introduced into the melt through the bottom electrode either via the metal rods or via vertically extending blind holes in the lower part of the bottom electrode lined with refractory material.

In the lower area, the metal rods are provided with a cored hole, which extends into the area of the upper, conductive layer. A number of radial holes are provided in the rods in this area in order for the purging gas to be able to reach the bath through the insulating layer. The metal rods may also be designed as continuous rods in the form of pipes, so that the purging gas flows into the melt directly and in a guided manner.

As an alternative, the purging gas can be introduced into the refractory material of the bottom electrode via vertically extending blind holes directly into the lower part of the bottom electrode. The bottom electrode is additionally divided by vertical plates into segments, and an adjustable amount of purging gas is admitted into the blind holes segment by segment via a purging gas line. In addition, horizontally arranged purging gas distribution plates may be arranged above the openings of the blind holes in order to achieve more effective purging effect.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a cross sectional view through the bottom electrode after hot repair;

FIG. 4 is a cross sectional view through the lower area of the furnace vessel;

FIG. 7 is a cross sectional view through the cathode and the anode at the beginning of the operation; and.

DETAILED DESCRIPTION OF THE PREFERRED EMBODIMENT

Figure 1:
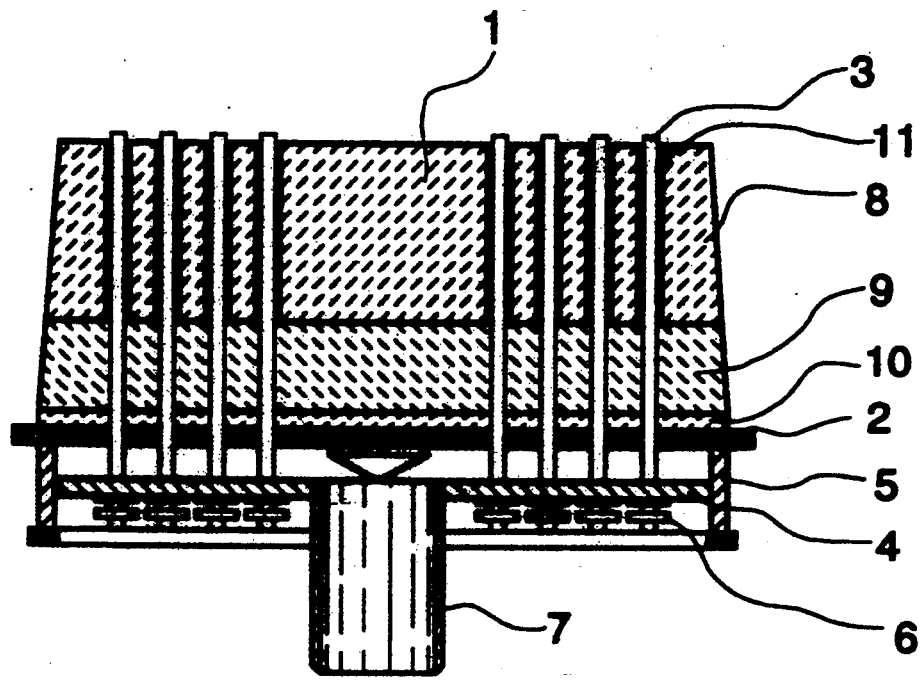
FIG. 1 is a cross sectional view through the finished bottom electrode.
Figure 2:
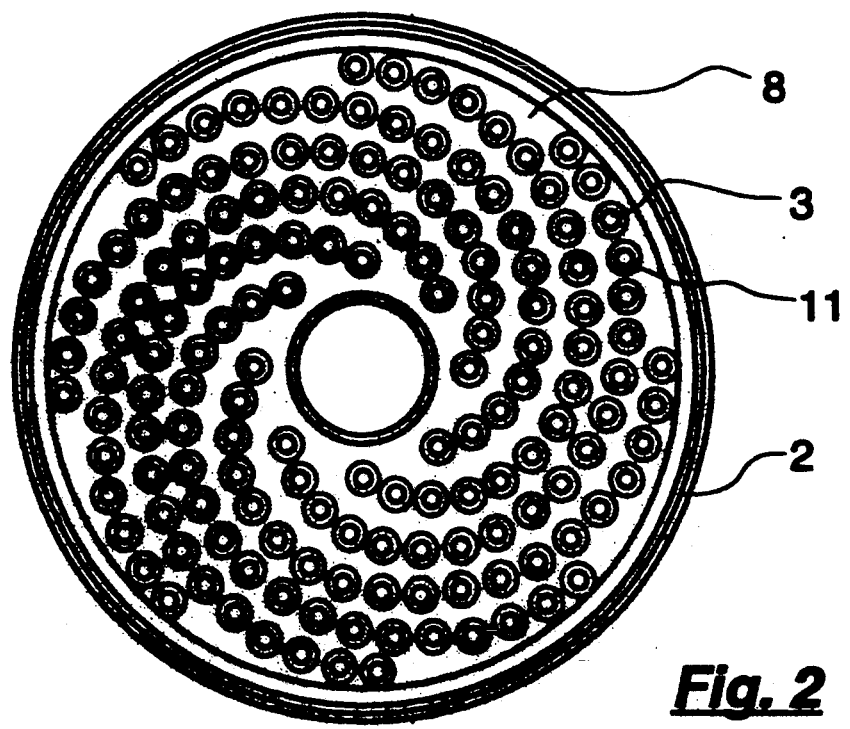
FIG. 2 is a top view of the bottom electrode.

FIGS. 1 and 2 show the design of the bottom electrode 1 according to the present invention, which consists of the metallic part and the nonmetallic part made of refractory materials.

The metallic part comprises the two steel plates, the steel plate 2 of the bottom electrode 1 and the base plate 4, the metal rods 3, the fastening elements 6, as well as the contacts of the bottom electrode 1 for current connection.

The refractory part is composed of an upper or surface layer consisting of conductive bricks 8, a middle layer consisting of conductive, monolithic lining material 9, and a lower or base layer consisting of nonconductive, insulating mass 10.

The metal rods 3 are embedded in a nonconducting, high temperature-resistant mass 11 in the area of the bricks 8.

FIG. 2 shows a top view of an exemplary embodiment of the bottom electrode 1 with the metal rods 3 arranged in arc segments.

FIG. 3 shows the bottom electrode 1, in which a conductive, high temperature-resistant patching material 12 is applied because of continuous wear above the metal rods 3 and the conductive bricks 8.

Coaxial cored holes 3a with a number of gas outlet openings 3b are provided in the area of the conductive bricks 8 as a gas purge means for discharging the purging gases from the metal rods 3.

FIG. 4 shows the arrangement of the metallic part of the bottom electrode 2, 3, 4, 6 in the lower part of the furnace vessel 23, 24. The furnace vessel 23 and the bottom electrode 1 are insulated by an insulating layer 15, which lies on claws of the vessel 23.

Figure 5:
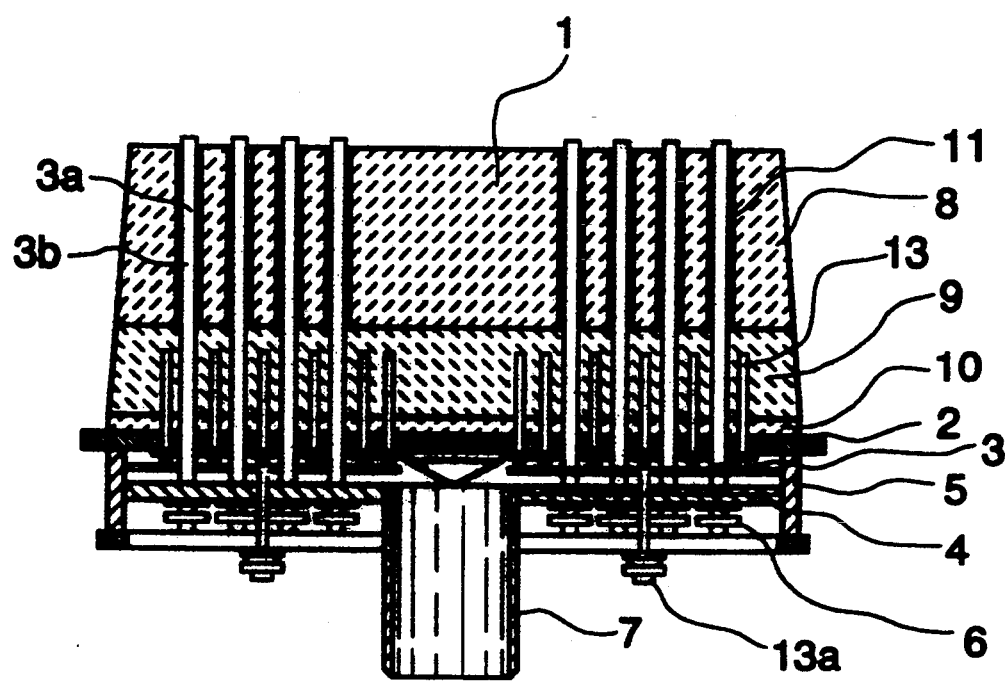
FIG. 5 is a cross sectional view through the bottom electrode with blind holes arranged in the lower part.

A purging gas is introduced through the bottom electrode 1 into the metal melt 19 either via the metal rods 3 with a number of gas outlet openings, as shown in FIG. 3, or, as is shown in FIG. 5, via vertically arranged blind holes 13 in the lower part of the bottom electrode 1 lined with the refractory material 9, 10, which blind holes 13 are connected to a purging gas line 13a that can be arranged between the steel plate 2 and the base plate 4.

Figure 6:
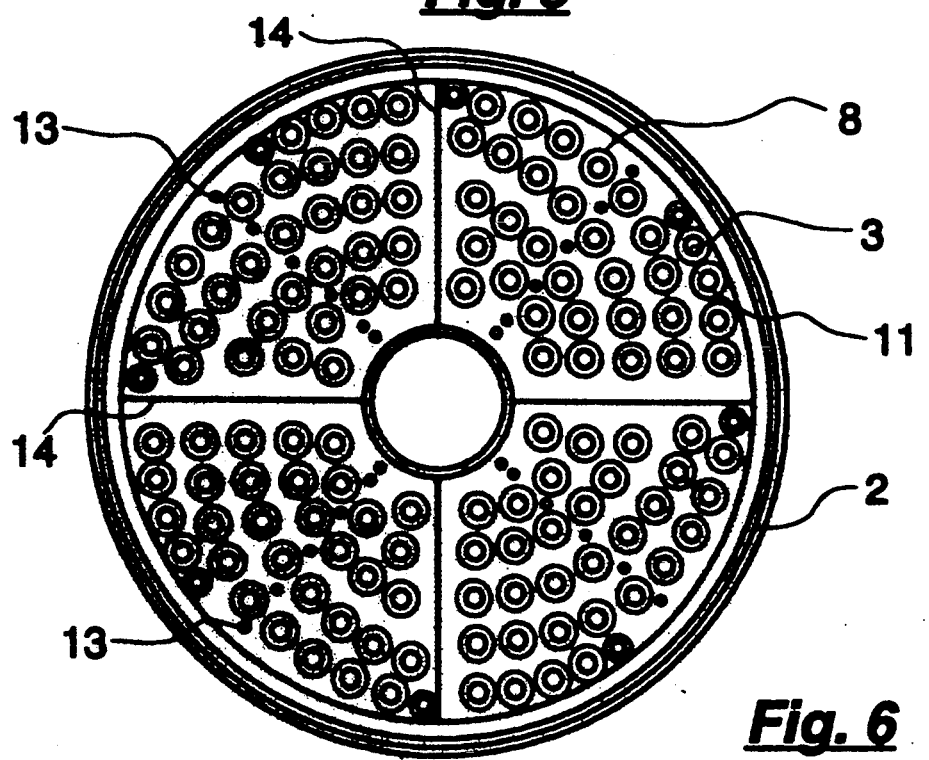
FIG. 6 is a top view of the bottom electrode with vertical segment plates.

FIG. 6 shows a top view of the bottom electrode 1, which is divided here by vertically arranged plates 14 into, e.g., four segments 14.

The blind holes 13 can be supplied with an adjustable amount of purging gas via the purging gas line 13a when needed.

Figure 7:
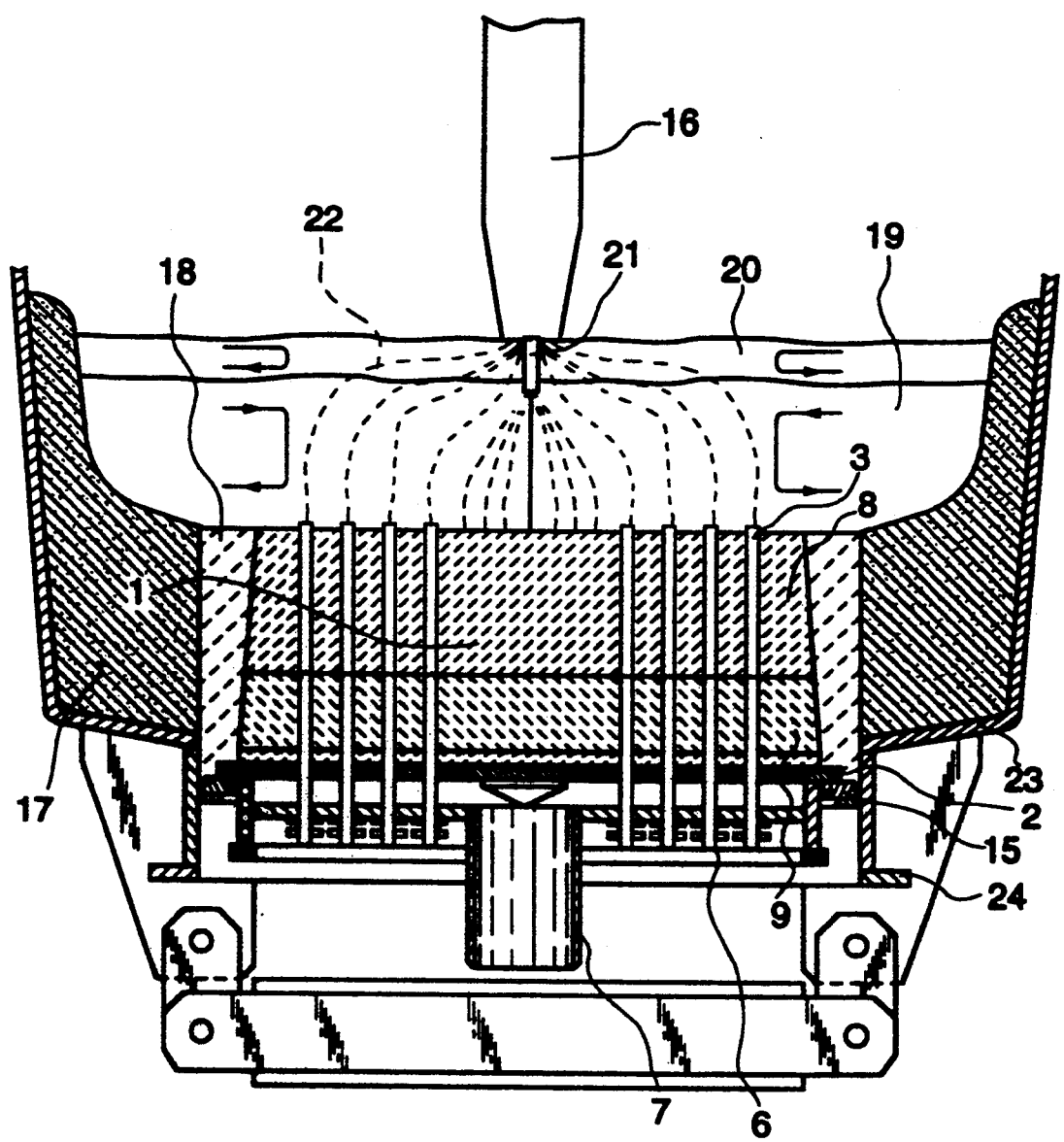
Figure 8:
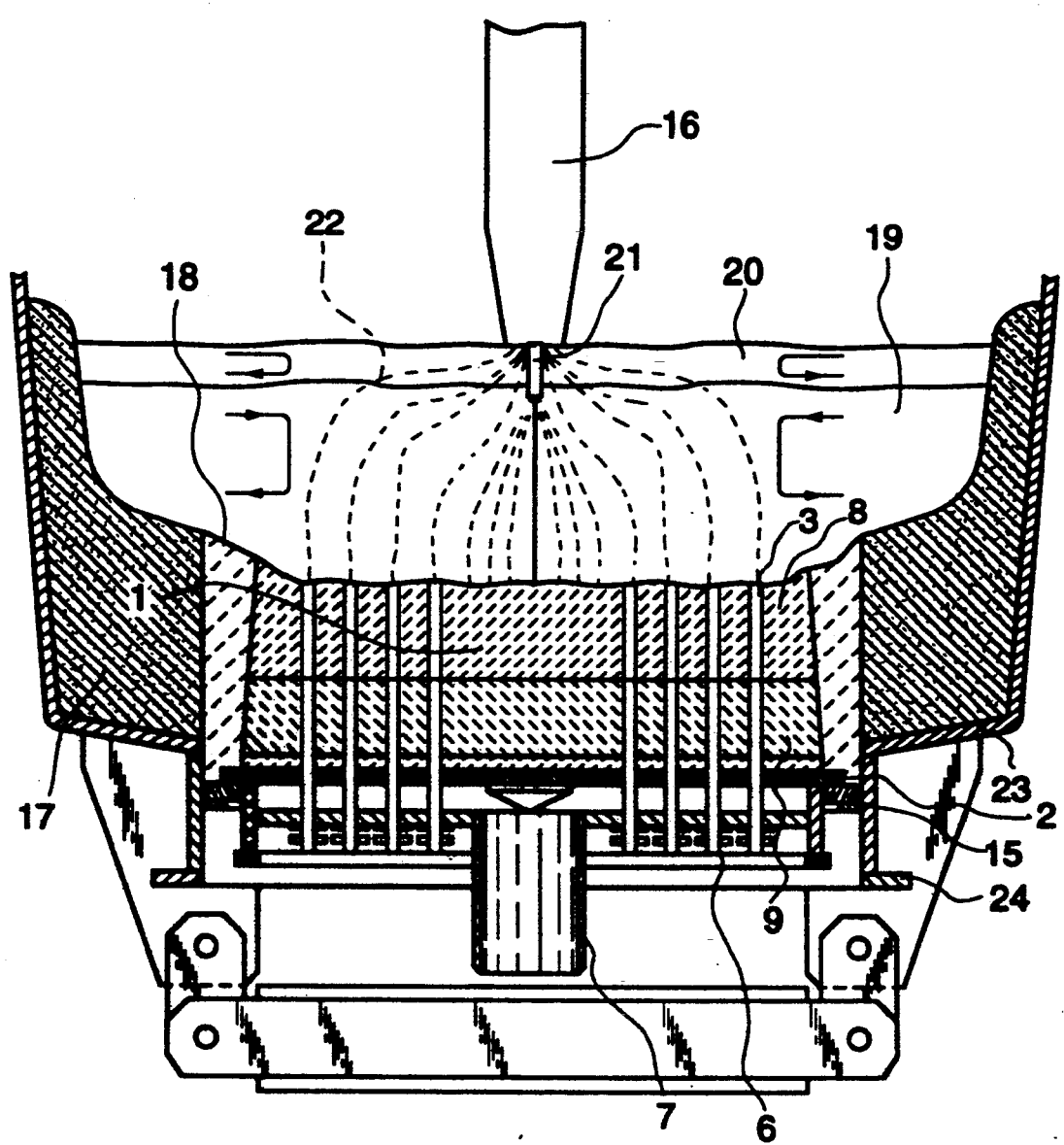
FIG. 8 is another cross sectional view through the lower part of the arc furnace during operation with continuing wear of the bottom electrode.

FIGS. 7 and 8 show the d.c. arc furnace in the operating state.

The current 22 flows from the graphite electrode (cathode) 16 via the melt 19 and the slag 20 floating above it to the bottom electrode 1, and it generates the arc 21 between the melt 19 and the graphite electrode 16.

The slag 20 and the steel melt 19 circulate in the furnace vessel above the bottom electrode 1, the hearth bottom 17 and the monolithic lining material 18 corresponding to the direction of the arrow shown. Due to this circulation, combined with an increased current and heat flow, the upper, conductive layer 8 and the metal rods 3 of the bottom electrode 1 will wear more rapidly than the nonconductive, tamped hearth bottom 17 and the monolithic lining material 18.

This more progressive wear shown in FIG. 8 is reduced by the measure shown in FIG. 3, by applying a conductive, high temperature-resistant patching mass 12, as well as by introducing inert gases through the metal rods 3 or through blind holes provided in the lower part of the bottom.

A conductive, high-temperature-resistant patching material 12 is applied as a so-called hot repair after complete emptying of the melting vessel. After the repair has been performed, the patching material covers the metal rods 3, the conductive bricks 8, and parts of the nonconductive, monolithic lining material 18, which was introduced between the hearth bottom 17 and the lined bottom electrode 1.

What is claimed is:

1. A bottom electrode for a direct current arc furnace, comprising:

a metallic part including a base plate and one of a plurality of metal rods or plates arranged in a hearth bottom of the furnace, lower ends of said one of said plurality of metal rods or plates are detachably fastened in said base plate; and layers of refractory material surrounding said one of said metal rods or plates, said one of said metal rods or plates being embedded in an upper layer formed of electrical conductive brick materials, a middle layer formed of electrical conductive, monolithic lining material and a lower layer formed of a nonconductive insulating mass located on the base plate, the bottom electrode being limited to an area above a circumference of said base plate.

2. A bottom electrode according to claim 1, wherein: said upper layer formed of conductive brick materials accounts for at least half of a height of a hearth bottom lining.

3. A bottom electrode according to claim 1, wherein:
said upper layer includes a nonconductive high temperature-resistant mass of low carbon material surrounding said one of said metal rods or plates.

4. A bottom electrode according to claim 1, wherein:
said bottom electrode defines means for introducing purging gases into a melt.

5. A bottom electrode according to claim 4, wherein:
said means for introducing purging gas comprises coaxial cored holes provided in said metal rods, said holes having lateral gas outlet openings.

6. A bottom electrode according to claim 5, wherein:
gas outlet openings are arranged in an area of said upper layer formed of conductive brick materials.

7. A bottom electrode according to claim 5, wherein:
said gas outlet openings are arranged under a head of said metal rods.

8. A bottom electrode according to claim 1, further comprising:
gas purge means including vertically extending blind holes provided in said refractory material of said bottom electrode for introducing purging gas.

9. A bottom electrode according to claim 8, wherein:
said bottom electrode is divided into segments by vertical plates and includes means for admitting an adjustable amount of purging gas into said blind holes, segment by segment via a purging gas line.

10. A bottom electrode according to claim 1, wherein:
a conductive, high temperature resistant patching material is provided on said upper layer.

11. A bottom electrode for an arc furnace, the electrode comprising:
a metallic part including a base plate and a metal rod having one end connected to said base plate and said metal rod extending from said baseplate;
a base layer positioned adjacent said base plate and around said metal rod, said base layer being formed from a nonconductive insulating mass;
a middle layer positioned adjacent said base layer, on a side of said base layer substantially opposite said base plate, said middle layer being formed from a electrical conductive monolithic lining material;
a surface layer positioned adjacent said middle layer, on a side of said middle layer substantially opposite said base layer, said surface layer being formed from electrical conductive bricks.

12. An electrode in accordance with claim 11, wherein:
said surface layer includes a nonconductive high temperature-resistant mass of low carbon material surrounding said metal rod.

13. An electrode according to claim 11, further comprising:
gas purge means for introducing purging gases into a melt, said gas purge means including holes defined by said metal rod, said holes having lateral gas outlet openings in said metal rod which communicate with one of said surface layer and said middle layer.

14. An electrode according to claim 11, further comprising:
gas purge means for introducing purging gases into a melt, said gas purge means including blind holes extending in one of said surface layer, said middle layer, and said base layer.

15. An electrode according to claim 11, further comprising:
a conductive, high temperature resistant patching material positioned on a side of said surface layer substantially opposite said middle layer.

* * * * *